United States Patent [19]

Noles

[11] Patent Number: 5,437,246
[45] Date of Patent: Aug. 1, 1995

[54] CORNER TURNING FREE-RUN ANIMAL TROLLEY SYSTEM

[76] Inventor: Larry J. Noles, 19 Union St., Waterbury, Vt. 05676

[21] Appl. No.: 180,982

[22] Filed: Jan. 14, 1994

[51] Int. Cl.⁶ .............................................. A01K 29/00
[52] U.S. Cl. ..................................................... 119/785
[58] Field of Search ............... 119/785, 784, 786, 787, 119/788, 769, 780; 104/53, 55, 61, 62, 98, 100

[56] References Cited

U.S. PATENT DOCUMENTS

| | | | |
|---|---|---|---|
| 2,500,805 | 3/1950 | Costello | 119/784 X |
| 3,648,664 | 3/1972 | Nunley | 119/785 |
| 4,667,625 | 5/1987 | Malone | 119/785 |
| 4,862,883 | 9/1989 | Brotz | 119/785 |

*Primary Examiner*—Thomas Price
*Attorney, Agent, or Firm*—Donald W. Meeker

[57] ABSTRACT

A cable loop is supported around each corner by a rotatable cable support with horizontal pulleys or other cable engaging device on the ends of spokes around the rotatable cable support, A central cylinder rotatably supported by a vertical rod may support the spokes or a pair of concentric rigid rings with the spokes piercing the rigid rings radially, The outer rigid ring may ride or a circular groove on roller bearings or the inner rigid ring may ride on a vertical rod, On straight cable runs, the trolley with the attached leash rides on a trolley vertical pulley wheel over the cable on the straight sections of the cable, At the corners, the trolley rides with one or two or four additional vertical pulley wheels on a single or double curved track below the rotatable cable support. The trolley rides around the curve inbetween two adjacent horizontal cable engaging device which support the cable around the turn and maintain the cable in a curved configuration, The rotable cable support is protected by a casing with flared sides on the cable openings to guide the trolley into the casing, Each protruding edge of track is ramped up into the casing to guide the pulley wheels onto the tracks, The tracks may be curved metal runners supported by brackets or curved cable supported by the casing.

20 Claims, 2 Drawing Sheets

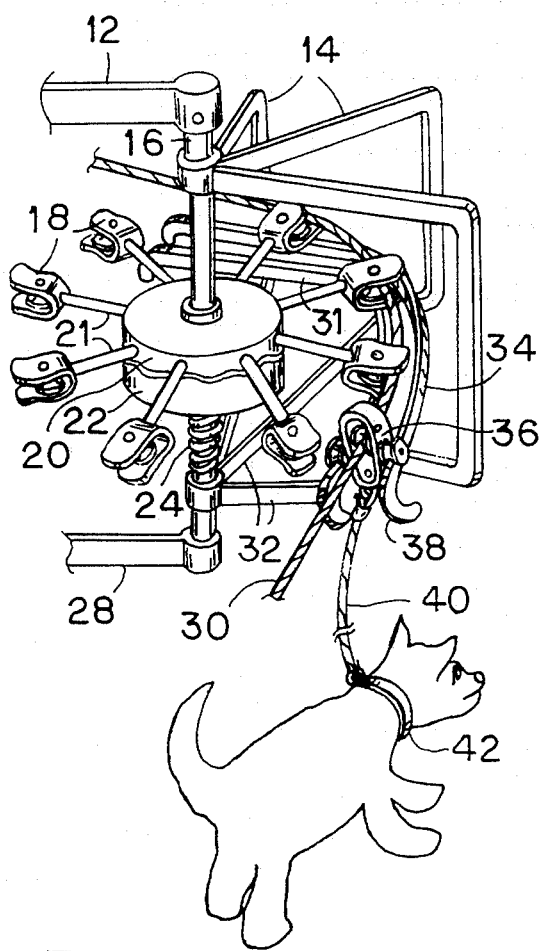
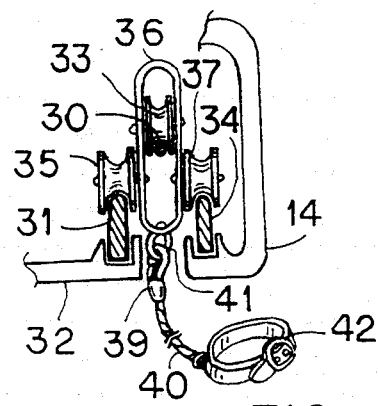
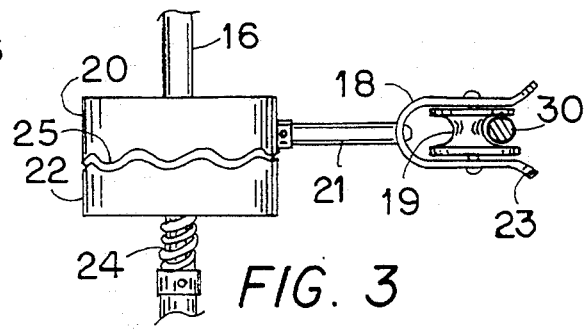
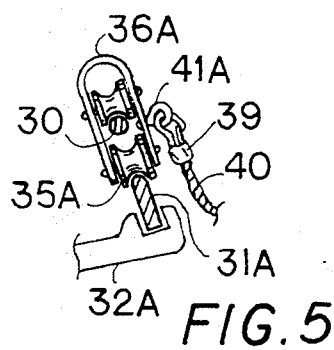
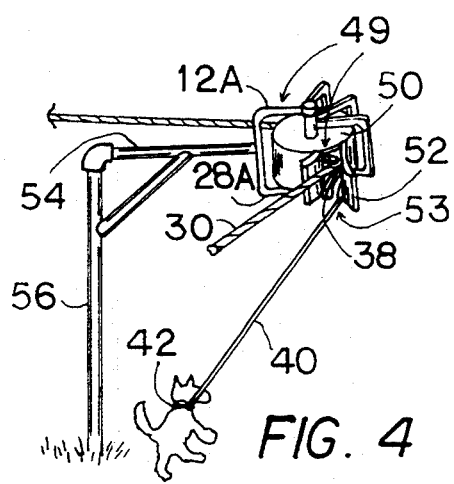
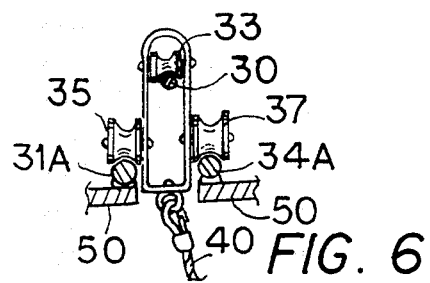
FIG. 1
FIG. 2
FIG. 3
FIG. 5
FIG. 4
FIG. 6

CORNER TURNING FREE-RUN ANIMAL TROLLEY SYSTEM

BACKGROUND OF THE INVENTION

1. Technical Field

The present invention relates to trolleys for an animal on a leash and in particular to an animal trolley cable system with corner cable supports and corner trolley support tracks to enable the trolley to turn corners.

2. Description of the Prior Art

Animals, particularly dogs, need exercise on a regular daily basis. Many towns and cities have leash laws requiring that animals be kept on a leash when outdoors. People walking or running with their pets every day may provide the pets with sufficient exercise. Many people prefer to let their pets run around the yard as a form of exercise and also to serve a guard function to prevent strangers from entering the property. One way to allow the animals to run around the yard and still keep them on a leash is to provide a trolley line with a leash.

Traditional dog trolleys consist of a straight piece of cable on which a wheel attached to a leash rides back and forth on the cable. This allows only straight line movement between two fixed points. This does not allow a free run for the dog and also sets up a situation in which the dog may be injured by running to the end and coming to an abrupt stop being choked by the collar attached to the leash.

Another problem with most dog tethering systems involves the dog becoming tangled with the leash around the supports for the trolley, thereby greatly restricting the travel of the dog.

It is desirable to provide a tethering system which allows a pet free run around the yard on all sides and to the limits of the property. There are animal "shocking" systems which bury a cable beneath the ground around the perimeter of the property aria provide the animal with a collar which shocks the animal if it crosses over the line. This seems somewhat cruel and may also be ineffective if the electricity shuts off or if there are some blocks to the electric shock connection at any points along the line. A free-run tethering system would insure that the animal remained exactly within desired bounds, including possible allowances for animal-free zones around the property to allow a mail delivery person access or for other purposes.

DISCLOSURE OF INVENTION

The present invention provides an animal trolley system with a cable loop and corner turning elements which can De set up in any desired configuration to enable an animal to nave free run of a property where it is desired for the animal to run. A continuous trolley for running eliminates the problem of the animal running to an end of a line and stopping short.

The present invention provides an animal trolley attached to a leash on an animal with one trolley pulley wheel riding on a cable. For turning corners, a corner turning system such as turnstile spoke-wheel pulley system or a system with rotatable concentric rigid rings with spokes, supports the cable at each corner with horizontal pulley wheels or other means forming a circular pattern and a track or tracks supports the other pulley wheel or wheels on the animal trolley at each corner in a matching circular pattern to facilitate turning a corner without disengaging the cable and without tangling the leash.

By extending support arms for the corner turning systems substantially away from vertical supports and by maintaining a minimum length of leash, animals will be prevented from encircling the supports and therefore the animals will never De able to tangle the leash around the supports.

An encasement with an open curved bottom slot for the leash covers over the cornering system to protect it from the weather and any debris that might fall from trees. Sloping sides and ramped tracks at the entrance to the corner turning system enable the trolley to glide freely onto the tracks of the cornering system, aligning the trolley wheels with the tracks and aligning the horizontal pulley wheels with the cable.

Outwardly flaring top and bottom outside edges on the turnstile pulley wheel casings enable each pulley wheel or other cable engaging means to engage the cable properly regardless of the level of the cable, which might be pulled up or down to some extent by the animal. The entrance to the cornering system and the tracks limit this cable displacement so that the amount of displacement is never more than the outwardly curved edges of the turnstile pulley wheel casing can accommodate to guide the wheel onto the cable.

BRIEF DESCRIPTION OF THE DRAWINGS

These and other details and advantages of my invention will be described in connection with the accompanying drawings, which are furnished only by way of illustration and not in limitation of the invention, and in which drawings:

FIG. 1 is a partial perspective view of a cornering system without the casing;

FIG. 2 is a partial elevational view in partial section showing the three-wheeled trolley with two wheels on the cornering tracks and the third wheel over the cable;

FIG. 3 is a diagrammatic partial elevational view of the turnstile showing one spoke with a pulley;

FIG. 4 is a partial perspective view of the cornering system mounted on a post in the ground:

FIG. 5 is a partial elevational view in partial section showing an alternate embodiment of the trolley with one wheel on a single track and one wheel over the cable;

FIG. 6 is a partial elevational view in partial section showing an alternate embodiment of the tracks using bent cables attached to the casing as tracks for the trolley;

BEST MODE FOR CARRYING OUT THE INVENTION

Figure 7:
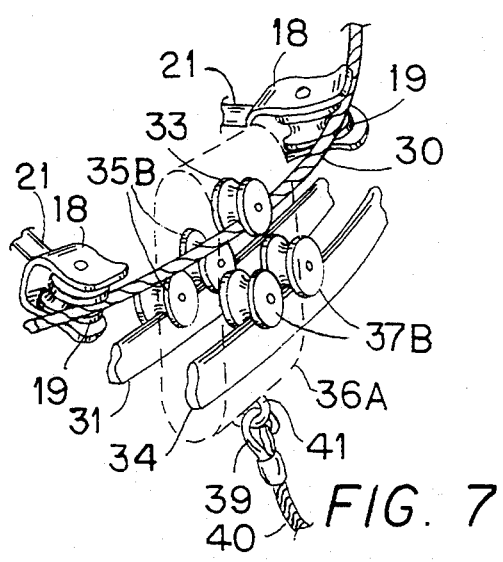
FIG. 7 is a partial perspective view in partial sect]on showing an alternate embodiment of the trolley having four wheels riding on the tracks.

In FIGS. 1, 2, and 3 a corner turning free-run animal trolley system comprises a support cable 30 formed in a loop (not fully shown), a trolley 36 having a trolley pulley wheel 33 to engage the cable 30 so that the cable supports the trolley on the cable with the trolley pulley wheel free to roll on the cable. An animal leash 40 is attached at one end by a releasable hook 39 to a ring 41 base of the trolley and at another end to a collar on the animal.

At points along the cable where turns are desired, a preferred embodiment of a corner turning system comprises a horizontal turnstile with spokes 21 radiating from a central rotatable cylinder 20, wherein the rotatable cylinder is mounted on a vertical rod or cylinder support 16. Each spoke 21 supports a horizontally oriented pulley casing 18 and a horizontal pulley wheel 19 at an outer end of each spoke. The horizontal pulley wheels 19 engage the cable 30 to support the cable in a circular curvature around the turn. At the same points along the cable where turns are desired, at least one curved track 31 and 34 to support at least one additional wheel 35 and 37 on the trolley, wherein the curvature of the curved track is similar to the curvature of the cable.

Each end 38 of each track 31 and 34 is ramped up onto the trace to accommodate the trolley 36 at various angles of approach to the track and to guide the additional trolley wheel(s) 35 and 37 onto the track(s) 31 and 34. The preferred embodiment of FIGS. 1-4 utilizes two curved tracks 31 and 34 and two wheels 35 and 37 on the sides of the trolley to ride on the tracks. In FIG. 5 an alternate embodiment comprises a single curved track 31A at each corner angled inwardly around the corner and a single additional wheel 35A centrally mounted on the trolley 36A to ride on the track 31A. In FIG. 7 an alternate embodiment of the trolley 36A (trolley casing shown dashed) comprises four wheels riding on two tracks with two aligned wheels 35B riding on the inside track 31 and two aligned wheels 37B riding on the outside trace 34. The animal leash 40 extends downwardly from the bottom of the trolley casing. This view also shows how the trolley rides inbetween the turnstile pulley casings 18 and wheels 19, which support the cable 30 around the corner.

Each horizontally oriented pulley casing 18 further comprises outwardly flaring top and bottom outside edges 23 of the pulley casing to engage the cable 30 and guide the horizontal wheel 19 onto the cable 30.

A split cylinder 20 and 22 in the center of the turnstile spokes comprises a first half of the split cylinder 22 attached to a cylinder support 16, and a second half of the split cylinder 20 containing the spokes 21 with pulley wheels 19, and the second half of the split cylinder 20 is rotatable. A spring 24 attaches between the first half of the split cylinder 22 and the cylinder support 16 to hold the cylinders together along the undulating intersection 25 of the cylinders allowing a restricted turning.

As seen in FIG. 4, a casing 50 encases the turnstile, wherein the casing comprises two openings sufficiently large to receive the trolley where the cable extends out of the casing, and a curved slot opening 49 around a bottom of the casing through which curved slot the animal leash extends as the trolley rounds the turn. The casing 50 further comprises, around each opening where the cable extends out of the casing, flared sides 52 to guide the trolley into each opening in a funnel-like fashion.

The support means for the turnstile spoked wheel comprises, supporting the vertical rod 16, a top bracket 12 and bottom bracket 28, as seen in FIG. 1, which attach to a corner of a building. Alternately, the support means for the turnstile spoked wheel comprises, supporting the vertical rod 16, top and bottom brackets 12A and 28A which attach to a horizontal support 54 extending from a pole 56 in the ground, as seen in FIG. 4. The length of the horizontal support 54 is such that the leash 40 length will not permit the animal to encircle the pole 56, thereby avoiding tangling around the pole.

In FIGS. 1, 2, and 4, the support means for the curved track comprises outer brackets 14 for the outer track 34 and inner brackets 32 for the inner track 31 extending from the vertical rod 16 under each track. Alternately, in FIG. 5 brackets 32A support a single track 31A at an angle inwardly directed around the curve. In FIG. 6, another alternate embodiment of the support means for the curved track comprises a bottom of the casing 50 and an alternate embodiment of the the track comprises casing track cables 31A and 34A attached to the bottom of the casing 50 wherein the curvature of the track cables 31A and 34A is the same as the curvature of the cable 30 around the corner.

Figure 8:
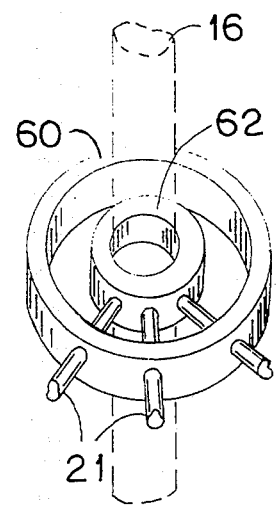
FIG. 8 is a simplified partial perspective view of an alternate embodiment of the turnstile having two concentric rims.

In FIG. 8 an alternate embodiment of the turnstyle system comprises two rigid concentric rings 60 and 62 supporting the spokes 21 (only three shown) piercing through both rings around the entire perimeter of the rings. Each spoke 21 at an outer end supports a horizontal pulley (not shown) for engaging the cable (not shown) around the corner in a manner similar to the horizontal pulleys of FIG. 1. It is understood that other cable support means are possible to maintain the cable in a curved configuration around the corner. The inner ring 62 may ride on a vertical rod (not shown) in the center using conventional means such as roller bearings, or the outer ring may ride on a circular track (not shown) on conventional roller bearings. The circular track could be a circular groove in the bottom of the turnstile casing.

In operation, the cable 30 supports the trolley 36 as the trolley moves along the straightaway portions of the cable loop. At the corners the tracks 31 and 34 support the trolley 36 and the cable is supported by a number of the horizontal pulley wheels 19 engaging the cable around the corner. The sharper the turn, the more horizontal pulley wheels engage the cable. The trolley rides inbetween an adjacent set of horizontal pulley wheels around the corner. After rounding the corner, the trolley is released from between the horizontal pulley wheels and returns to ride on the cable for the next straight portion of the run. The animal may run in either direction. The leash length is made sufficiently short so that the animal cannot encircle vertical post supports in the ground, thereby avoiding entanglement around the post supports.

Coated metal cable is preferred for strength and resistance to weathering. The tracks may be metal runners or cables. Most of the corner turning components are preferably weather resistant metal.

It is understood that the preceding description is given merely by way of illustration and not in limitation of the invention and that various modifications may be made thereto without departing from the spirit of the invention as claimed.

I claim:

1. A corner turning a free-run animal trolley system comprising:
   a support cable formed in a loop;
   a trolley having sides encasing a trolley pulley wheel to engage the cable so that the cable supports the trolley on the cable with the trolley pulley wheel free to roll on the cable;
   an animal leash attached at one end to a base of the trolley and at another end adapted to be attached to an animal;

at points along the cable where turns are desired, a horizontal rotatable cable support means for supporting the cable and maintaining the cable in a curved configuration around a turn;

at the same points along the cable where turns are desired, at least one curved track to support at least one additional wheel on the trolley, wherein the curvature of the curved track is similar to the the curved configuration of the cable;

a vertical support for rotatably supporting the horizontal rotatable cable support means;

and a track support extending from the vertical support under said at least one curved track.

2. The invention of claim 1 wherein the horizontal rotatable cable support means comprises a turnstile with spokes radiating from a central point, and wherein each spoke supports a horizontally oriented pulley casing and a horizontal pulley wheel at an outer end of each spoke, which horizontal pulley wheels engage the cable which bends around said curved configuration around a turn.

3. The invention of claim 2 wherein the turnstile further comprises a rotatable cylinder in a center of the turnstile, wherein the rotatable cylinder is mounted rotatably on a vertical rod.

4. The invention of claim 3 further comprising a split cylinder in the center of the turnstile spokes, wherein a first half of the split cylinder is attached to a cylinder support, and a second half of the split cylinder contains the spokes with pulley wheels, and the second half of the split cylinder is rotatable.

5. The invention of claim 4 further comprising a spring attached between the first half of the split cylinder and the cylinder support.

6. The invention of claim 3 wherein the support means for the turnstile comprises, supporting the vertical rod, top and bottom brackets which attach to a corner of a building.

7. The invention of claim 3 wherein the vertical support for the turnstile further comprises, supporting the vertical rod, top and bottom brackets which attach to a horizontal support extending from a pole in the ground, and wherein the length of the horizontal support is such that the leash length will not permit the animal to encircle the pole.

8. The invention of claim 3 wherein the track support comprises brackets extending from the vertical rod and attaching under each track.

9. The invention of claim 2 wherein the turnstile further comprises at least two concentric rigid rings with the spokes piercing the rigid rings radially to support the spokes.

10. The invention of claim 9 wherein an innermost rigid ring rotates on a vertical rod.

11. The invention of claim 9 wherein at least an outermost ring rotates in a circular fashion.

12. The invention of claim 2 wherein each end of said at least one track is ramped up onto said at least one track to accommodate the trolley at various angles of approach to said at least one track and to guide the additional trolley wheel onto said at least one track.

13. The invention of claim 12 wherein each horizontally oriented pulley casing further comprises outwardly flaring top and bottom outside edges of the pulley casing to engage the cable and guide its respective horizontal wheel onto the cable.

14. The invention of claim 13 comprising two curved tracks at each corner and two additional wheels on the sides of the trolley to ride on the tracks.

15. The invention of claim 13 comprising two curved tracks at each corner and four additional wheels on the sides of the trolley to ride on the tracks with two wheels on each track.

16. The invention of claim 13 comprising a single curved track at each corner angled inwardly around the corner and a single additional wheel centrally positioned on the trolley to ride on the track.

17. The invention of claim 13 further comprising a casing around the cable support means, wherein the casing comprises two openings sufficiently large to receive the trolley where the cable extends out of the casing, and a curved slot opening around a bottom of the casing through which curved slot the animal leash extends.

18. The invention of claim 17 wherein the casing further comprises, around each opening where the cable extends out of the casing, flared sides to guide the trolley into each opening.

19. The invention of claim 17 wherein the track support comprises a bottom of the casing.

20. The invention of claim 19 wherein the track comprises a least one curved track cable attached to the bottom of the casing.

* * * * *